Sept. 2, 1947.  A. D. LE SAGE  2,426,776
THERMOMETER SHAKER
Filed Oct. 23, 1945
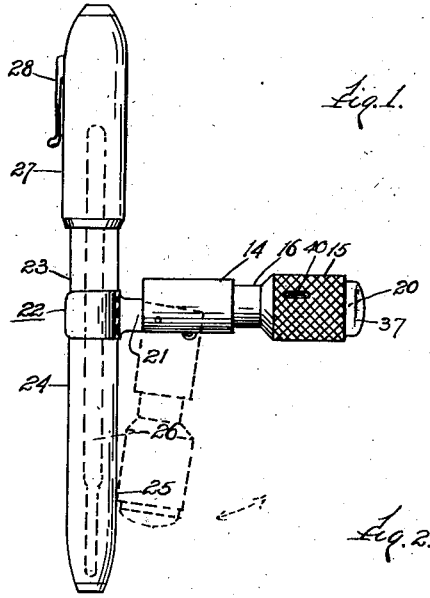
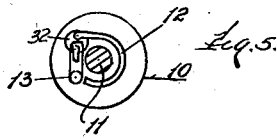
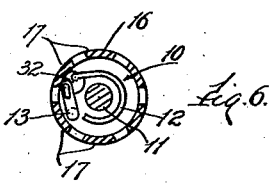
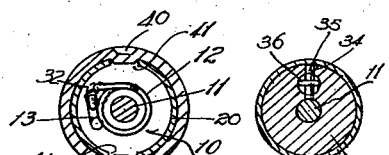
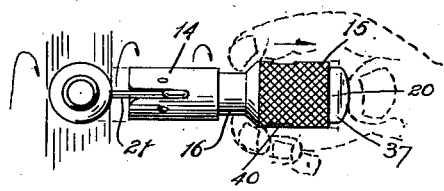
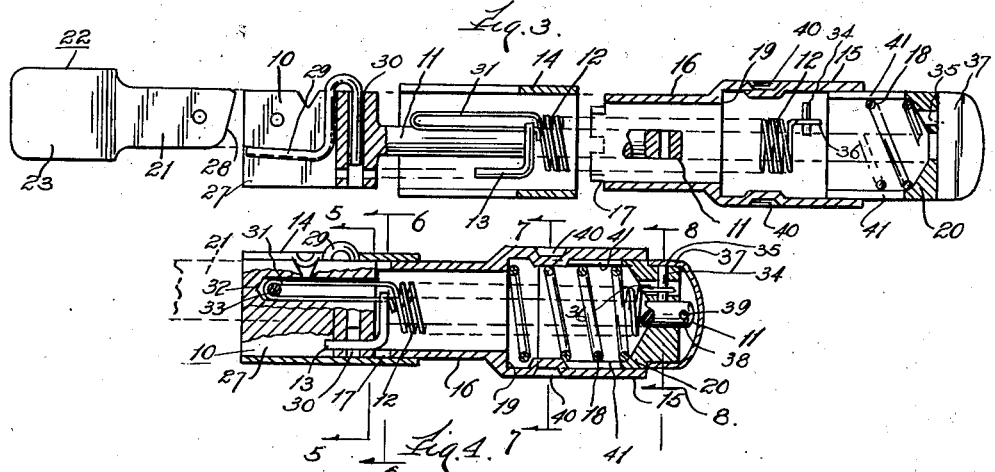
Inventor:
Aaron D Le Sage.
by James C McKnight
   Attorney.

Patented Sept. 2, 1947

2,426,776

UNITED STATES PATENT OFFICE 2,426,776

THERMOMETER SHAKER

Aaron D. Le Sage, Manteno, Ill.

Application October 23, 1945, Serial No. 623,963

2 Claims. (Cl. 73—373)

This invention relates to a device for whirling a thermometer to return the mercury or the like to normal position.

In hospitals, homes, or laboratories, when a thermometer has been used to take a temperature reading, the mercury or other temperature indicating means in the thermometer has reached a high register. After disinfecting but before the thermometer could be used again, it is necessary for the user to shake the thermometer vigorously to return the mercury or the like to normal position. This shaking is annoying and tedious. In some instances the shaking has not been sufficient to return the thermometer to normal so that improper readings have resulted. Often the shaking has resulted in the thermometer slipping out of the hand and being broken.

It is among the objects of this invention to solve the foregoing problems and to provide a device that will safely, accurately and quickly whirl a thermometer so as to return the mercury or the like to normal position. My invention also contemplates such other objects, advantages and capabilities as will later more fully appear and which are inherently possessed by my invention.

While I have shown in the accompanying drawings a preferred embodiment of my invention, yet it is to be understood that the same is susceptible of modification and change without departing from the spirit of my invention.

Referring to the drawings:

Fig. 1 is a side elevational view of my device; Fig. 2 is a top plan view showing method of operation; Fig. 3 is an enlarged sectional view of parts grouped in line of assembly; Fig. 4 is an enlarged view of parts assembled and Figs. 5, 6, 7, and 8 are detail sectional views on lines 5—5, 6—6, 7—7, and 8—8 of Fig. 4 respectively.

The embodiment selected to illustrate my invention comprises a body member 10, to which is attached a shaft 11 extending beyond one end of said body member. A coil spring 12 is mounted on said shaft 11. A dog 13 is attached to said spring 12 adjacent its inner portion. A cover member 14 is mounted on said body member 10, and extends outwardly therebeyond.

A manual member 15 has a reduced inner end portion 16 extending within the open outer end of cover member 14. Said end portion 16 has a plurality of spaced teeth 17 positioned normally to engage dog 13.

Another coil spring 18 is positioned within manual member 15 with its inner end bearing against shoulder 19 and its outer end against push button 20 slidably mounted at the outer end of manual member 15. Said spring 18 holds portion 16 against dog 13.

To the inner end of body member 10 is hingedly attached stem 21 of holder 22, the arms 23 of which are removably and adjustably attached to the body 24 of a casing 25 adapted to removably hold a thermometer 26. A cap 27 is adapted to removably close said casing 25. A clip 28 is mounted on cap 27.

Push button 20 has a hole 34 which receives short pin 35, to the inner portion of which is attached loop 36 of spring 12. End cap 37 covers this pin 35 and the end of push button 20. Dog 13 normally engaging one of teeth 17 prevents undesired unwinding of coil spring 12.

At the extreme end of shaft 11 is a transverse hole 38 to receive pin 39 to retain push button 20 from displacement from the assembly.

In manual member 15 are a pair of spaced keys 40 adapted to fit within slots 41 of push button 20 so that when manual member 15 is turned, push button 20 is also turned therewith. This turns pin 35 and winds spring 12.

In use, a user, just having taken a temperature reading and disinfected the thermometer, desires to return the mercury or the like in the thermometer to normal, so that the thermometer may again be used. The user places the thermometer 26 in the casing 25 and attaches the cap 27. The user then turns or winds manual member 15 clockwise. This turns pin 35, which through loop 36 winds spring 12 to tighten the same. Teeth 17 are engaged by dog 13 to prevent reverse movement. The user then grasps manual member 15 and presses inwardly on push button 20. This applies pressure to spring 18 against shoulder 19 and causes relative movement between shaft 11 and manual member 15 so that teeth 17 are moved away from engagement with dog 13. Spring 12 released, uncoils and whirls body member 10 and holder 22. The thermometer in holder 22 is agitated and the mercury or the like therein is shaken to normal position so that it may be immediately used for obtaining another temperature reading.

It will be noted that stem 21 is hingedly attached to body member 10. In use body member 10 may be pivoted so that manual member 15 rests against the body portion 24 of casing 25. This permits the user to clip the device to pocket or belt so that the device may be easily carried and then easily removed for future use, as shown in Fig. 1.

In the body member 10 in transverse slot 27, stem 21 of holder 22 is hingedly mounted. A cam part 28 of stem 21 rests upon spring 29 which is supported in slot 27 and ends in bore 30 of body member 10.

To retain and anchor the forward end of coil spring 12, an integral long loop portion 31 is set into a deep bore 32 through which a hinge pin 33 is thrust acting to retain the spring 12 and the dog 13.

Having thus described my invention, I claim:

1. A device adapted to agitate a thermometer and return the mercury or the like therein to normal position comprising a body member, a clamp pivotally attached to one end of said body member, a casing for housing a thermometer therein attached to said clamp, a shaft attached to the other end of said body member and extending outwardly therefrom, a coiled spring mounted on said shaft, a dog attached to the inner portion of said spring and said body member, a tubular cover mounted on said body member, a hollow manual member and having a reduced inner portion having a shoulder, said reduced inner portion extending within said cover and having spaced teeth positioned to contact said dog, a resilient member placed within said manual member, a push button slidably mounted at the outer end of said manual member, said resilient member extending between said shoulder and push button, a pin attached to said push button, the outer end of said spring being attached to said pin, said manual member adapted to be rotated clockwise to tighten said spring, said push button adapted upon inward pressure against said resilient member to force said shaft to move said body member and thereby disengage said spaced teeth from said dog, thereby releasing said spring to uncoil and whirl said body member and said casing, whereby mercury or the like of a thermometer contained in said casing is returned to normal position.

2. A thermometer shaker comprising a body member, means for removably holding a thermometer attached to said body member, said body member having a shaft extending therefrom, a coil spring surrounding said shaft, a dog attached to one end of said spring and to said body member, a tubular member mounted on said body member and embracing a portion of said shaft, a hollow rotatable manual member extending into said tubular member having spaced teeth for engaging said dog, a biased push button slidable in said hollow manual member and rotatable therewith, the other end of said spring being attached to the push button, said push button having a cap which extends over the end of the shaft, whereby inward pressure on said push button causes relative movement between said hollow rotatable manual member and said shaft to disengage said spaced teeth from said dog and thereby uncoiling of the spring when wound to rotate the body member with its attached thermometer holding means.

AARON D. LE SAGE.

REFERENCES CITED

The following references are of record in the file of this patent:

UNITED STATES PATENTS

| Number | Name | Date |
|---|---|---|
| 987,749 | Schneider | Mar. 28, 1911 |
| 1,024,824 | Boman | Apr. 30, 1912 |
| 1,041,135 | McIntyre | Oct. 15, 1912 |

FOREIGN PATENTS

| Number | Country | Date |
|---|---|---|
| 413,015 | Great Britain | July 12, 1934 |